United States Patent
Clifton et al.

(10) Patent No.: US 6,273,570 B1
(45) Date of Patent: Aug. 14, 2001

(54) COMPACT LIGHT PATH AND PACKAGE FOR LIQUID CRYSTAL PROJECTION DISPLAYS

(75) Inventors: Benjamin R. Clifton, Oregon City; John P. Fogarty, West Linn, both of OR (US)

(73) Assignee: Clarity Visual Systems, Inc., Wilsonville, OR (US)

(*) Notice: Subject to any disclaimer, the term of this patent is extended or adjusted under 35 U.S.C. 154(b) by 0 days.

(21) Appl. No.: 09/425,316

(22) Filed: Oct. 21, 1999

(51) Int. Cl.[7] .................................................. G03B 21/28
(52) U.S. Cl. ................................. 353/74; 353/77
(58) Field of Search ............................ 353/69, 70, 74, 353/77, 78, 98, 99, 119, 121

(56) References Cited

U.S. PATENT DOCUMENTS

| | | | |
|---|---|---|---|
| 4,257,694 | * | 3/1981 | Reinhard ................................. 353/78 |
| 4,572,632 | * | 2/1986 | Bodier et al. ........................... 353/79 |
| 4,640,597 | * | 2/1987 | Okano et al. ........................... 353/79 |
| 4,730,919 | * | 3/1988 | Schuch .................................... 353/79 |
| 4,810,086 | * | 3/1989 | Tachibana et al. ..................... 353/79 |
| 5,184,248 | | 2/1993 | de Vann et al. ...................... 359/483 |
| 5,278,595 | * | 1/1994 | Nishida et al. ......................... 353/78 |
| 5,371,559 | | 12/1994 | San-Nohe et al. ..................... 353/31 |
| 5,422,691 | * | 6/1995 | Ninoyima et al. ..................... 353/69 |
| 5,467,154 | * | 11/1995 | Gale et al. .............................. 353/77 |
| 5,473,339 | | 12/1995 | Kanatani et al. ...................... 345/87 |
| 5,601,351 | | 2/1997 | van den Brandt ..................... 353/20 |
| 5,622,419 | * | 4/1997 | Holder et al. .......................... 353/77 |
| 5,671,993 | * | 9/1997 | Shikama ................................. 353/77 |

* cited by examiner

Primary Examiner—William Dowling
(74) Attorney, Agent, or Firm—Stoel Rives LLP

(57) ABSTRACT

An LCD projection display (120) houses a projection module (10) in which light propagates through an LCD module (38) at a shallow angle (62) that improves the contrast ration of and intentionally Keystones the image bearing light. The Keystoned light is reflected by a fold mirror (64) that is mounted at a 52° upward angle, which introduces more intentional Keystoning. A projection lens (16) is mounted coaxial to a tilted optical axis (12), but the Keystoned image bearing light is refracted about 10° off the optical axis and follows a Keystoning axis (70) through the projection lens. The light propagating from the projection lens is reflected by a main fold mirror (122) that is mounted at a 57° angle from the vertical to project the image bearing light onto a 10° slanted projection screen (98). Central light rays (102), image margin light rays (106), and the axial light rays (125) propagate unequal distances from the projection lens to the projection screen and are, therefore, unequally magnified to compensate for the Keystoning introduced by the LCD module. The steep mounting angle of the main fold mirror allows positioning it higher and more forward in the display, which reduces first surface reflections from ambient lighting and allows a significantly reduced depth dimension for the display.

18 Claims, 5 Drawing Sheets

FIG. 1 (PRIOR ART)

Straight Screen

FIG. 2 (PRIOR ART)

Slanted Screen

COMPACT LIGHT PATH AND PACKAGE FOR LIQUID CRYSTAL PROJECTION DISPLAYS

TECHNICAL FIELD

This invention relates to display devices and more particularly to a compact light path and packaging structure for liquid crystal projection displays that facilitates their serviceability and viewability in overhead viewing applications.

BACKGROUND OF THE INVENTION

It is well known to mount display monitors above eye-level in informational and advertizing applications, such as accommodation information kiosks, airline flight information displays, and interactive menu displays. For maximum effectiveness, such displays should be highly viewable, especially in brightly lighted environments.

Figure 1:
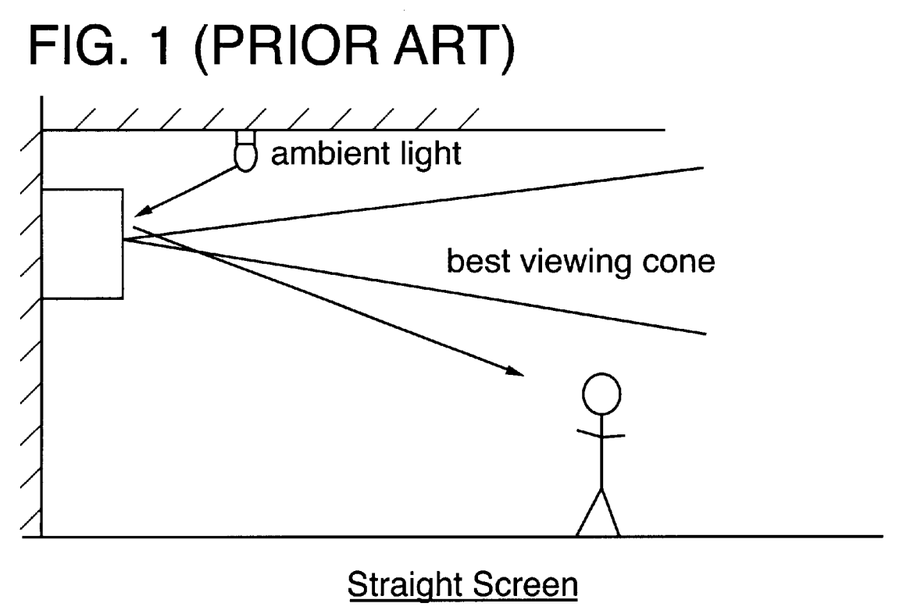
FIG. 1 is a simplified pictorial view of a prior art straight screen display mounted off the ground and at or near ceiling level in a typical viewing application.

FIG. 1 shows a prior art vertical, or "straight" screen display mounted at or near ceiling level in a typical viewing application. It is well known that image brightness it a key viewability factor and that the human perception of image brightness is affected by the image contrast, i.e., the higher the image contrast, the brighter it appears. Moreover, the brightest viewing angles for displays are in a "best viewing cone" having an axis that is normal to the screen. Unfortunately, using a straight screen directs the best viewing cone over the head of the viewer and, to make matters worse, reflects ambient light off the vertical screen and down toward the viewer, which reduces the image contrast and "washes out" the display, giving a perception of reduced brightness.

Figure 2:
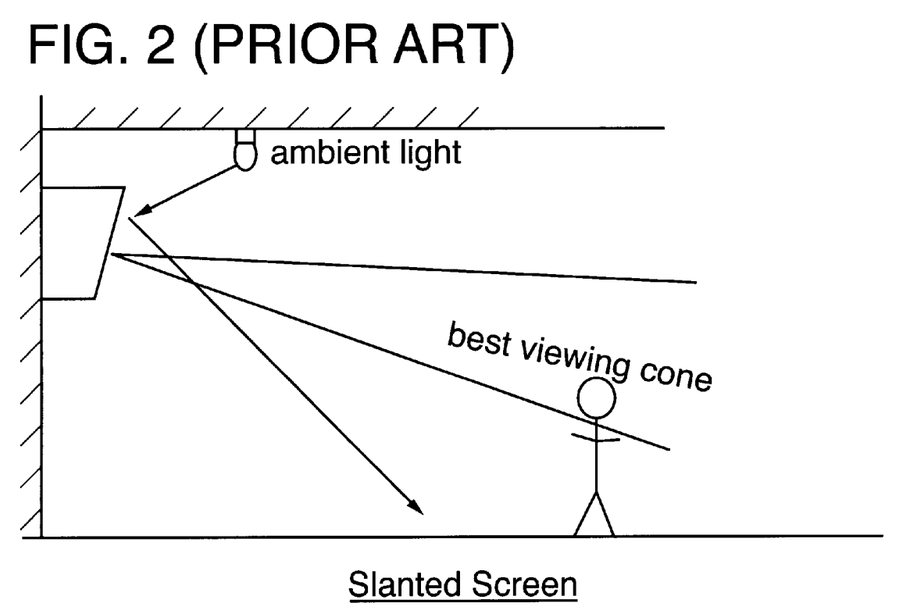
FIG. 2 is a simplified pictorial view of a prior art slanted screen display mounted off the ground and at or near ceiling level in a typical viewing application.

As shown in FIG. 2, prior workers have attempted to solve this problem by simply slanting the screen downward, and in some applications it viewability is improved. However, in interactive menu display applications, where graphic images and text are intermixed, viewability and text readability are of upmost importance and simply slanting a conventional cathode-ray tube ("CRT") display is often unsuitable. In particular, text readability typically requires high display resolution and a relatively large screen size, such as a 38 inch diagonal, to display readily readable textual characters at eight to 12 foot viewing distances. CRT displays having such resolutions and screen sizes are simply too heavy and bulky for wall or ceiling mounting. CRT display disadvantages include the possibility of causing lifting injuries to service personnel, mounting shelf or bracket size and strength requirements, lack of service accessibility, and extension distance from the wall.

Slanting CRT displays downward to increase their viewability often complicates the wall mounting and service access problems, and increases the extension distance from the wall.

If These are serious problems in the emerging market for interactive menu displays in fast food restaurants. Such displays must mount above and behind the serving counter in existing, brightly illuminated, relatively shallow spaces, previously occupied by conventional static menu boards. Moreover it is preferable that an array of such displays be mounted side-by-side to form an elongated "banner" display that combines animated display advertizing with interactive menus for each serving station. Of course, displays in fast food restaurants must also be highly reliable, compact, clean, well ventilated, readily serviceable, and affordable. Down time for any reason detracts seriously from profitability.

There are previously known techniques for employing various kinds of display technologies in "video walls" and signage applications. Multiscreen displays employ an abutted array of substantially identical display devices that each display a subdivided portion of a total image such that together they display the total image. Because multiscreen displays require that each of the display devices be perceived as part of a whole large display device, it is important to make the boundaries between adjacent display devices appear as inconspicuous as possible. Unfortunately, the human eye is very sensitive to boundary discontinuities, making an acceptably "seamless" multiscreen display very difficult to produce. CRT-based multiscreen displays also have image stability and image matching problems that only make the problems worse.

Many of the above-stated problem can be mitigated by employing digitally addressed, compact, lightweight displays, based on those described in copending U.S. patent application Ser. No. 08/740,966, filed Nov. 5, 1996, for COLOR AND LUMINANCE CONTROL SYSTEM FOR LIQUID CRYSTAL PROJECTION DISPLAYS, which is assigned to the assignee of this application and incorporated herein by reference. However, the liquid crystal display ("LCD") projection systems described therein are more suitable for floor-standing video wall applications because they are heavy, have protruding legs, large straight screens, are vertically stackable, and have front and rear service access. Unfortunately, these features render them generally unsuitable for elevated wall mounting. Moreover, such LCD projection systems have a large internal fold mirror for projecting the image on the projection screen. If the projector is mounted in a elevated position, the fold mirror produces a first surface reflection from the ambient room lighting to the screen, further washing out the projected image.

SUMMARY OF THE INVENTION

An object of this invention is, therefore, to provide a large screen display suitable for mounting, servicing, and viewing at or near a ceiling.

Another object of this invention is to provide a compact and serviceable modular packaging apparatus for an LCD projection display.

A further object of this invention is to provide a large screen LCD projection display having a minimal depth, improved contrast ratio, and high reliability.

Still another object of this invention is to provide an LCD projection display suitable for interactive menu use in a fast food restaurant.

An LCD projection display of this invention houses a projection module in which light propagating from a light source propagates through an LCD module at a shallow angle relative to an optical axis, thereby improving the contrast ratio of and introducing intentional trapezoidal distortion, referred to as "Keystoning," to the image bearing light. The Keystoned image bearing light is reflected by a fold mirror that is mounted at 52° upward angle, which further Keystones the image. A projection lens is mounted coaxial to the optical axis, which now extends upward 52° relative to the plane of the fold mirror. However, the Keystoned image bearing light is refracted about 10° off the optical axis 12 and, therefore, surrounds and follows a Keystoning axis through the projection lens.

The image bearing light propagating from the projection lens is reflected by a main fold mirror that is mounted at a 57° downward from the vertical direction, thereby projecting the image bearing light onto a 10° downward slanted projection screen. Because the image bearing light is Keystoned, central light rays propagating along the Keystoning axis strike the center of the projection screen, and image margin light rays strike the top and bottom margins of the projection screen. Axial light rays propagating along the optical axis strike the projection screen significantly above its center. The central, image margin, and axial light rays all propagate unequal distances from the projection lens, off the main fold mirror, to the projection screen and are, therefore, unequally magnified by amounts that compensate for the Keystoning introduced by the LCD module and the fold mirror angle.

The steep mounting angle of the main fold mirror allows positioning it higher and more forward in the projection display, which is advantageous because projection screen washout caused by first surface reflections from ambient lighting off the main fold mirror are reduced.

The fold mirror positioning is further advantageous because the depth dimensions of the projection display 120 are reduced.

A total of five fold mirrors in the LCD projection display provide a total optical axis length that is over three times longer than the depth of the display. Much of this compactness is embodied in four fold mirrors in a projection module housing the light source, LCD module, and projection lens. This creates a compact module that is accessible from the bottom of the display. Moreover, the projection screen is removable to provide front access to the projection module and other interior components. All active components of the projection display are, therefore, quickly replaceable without dismounting the projection display from its wall or ceiling mounted position. Such replaceable components and modules are also lightweight, facilitating safe and rapid servicing by a single repair person.

The front and bottom access of the LCD projection display is further advantageous because internal cable channels are rendered accessible for interconnect wiring after display installation.

Another advantage of the LCD projection display is that the large aperture sizes and angled light path of the LCD module allow suitable illumination of the projection screen with a 120 watt lamp, whereas prior designs required a 400 watt lamp to achieve the same brightness. The resulting low power illumination system provides reduced heat, higher reliability, longer operating life, and eases the cooling requirements for the LCD projection display. Restaurant applications, in particular, require readily replaceable and cleanable filters, which are preferably mounted in and removable from the bottom surface of the LCD projection display.

Additional objects and advantages of this invention will be apparent from the following detailed description of a preferred embodiment thereof that proceeds with reference to the accompanying drawings.

DETAILED DESCRIPTION OF A PREFERRED EMBODIMENT

Figure 3:
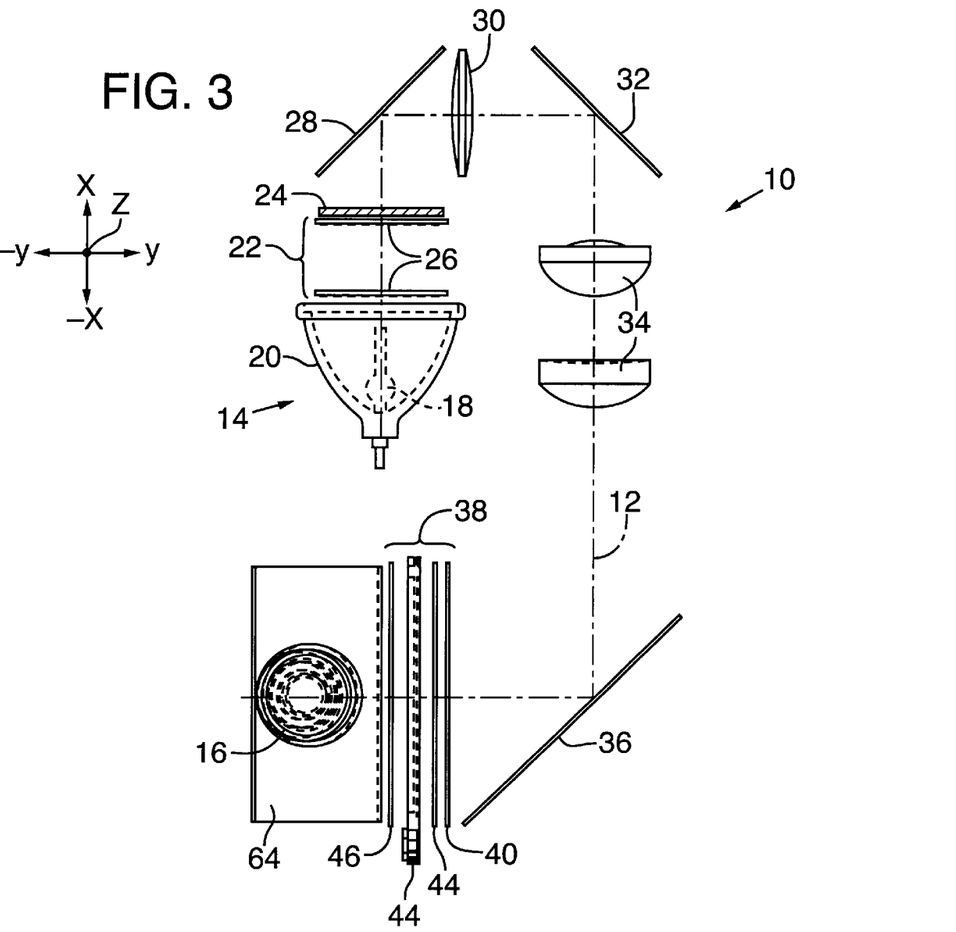
FIGS. 3 and 4 are simplified pictorial top and side views of a projection module of this invention showing the arrangement of optical elements along a folded optical axis from a lamp to a projection lens.
Figure 4:
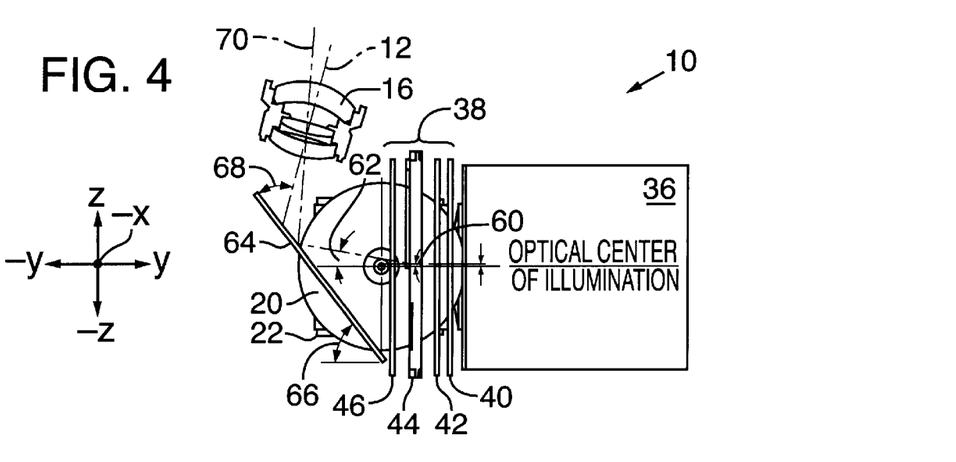

FIGS. 3 and 4 are respective top and side views of a projection module 10 of this invention showing a preferred arrangement of optical elements along a folded optical axis 12 extending from a lamp assembly 14 and through a projection lens 16.

Lamp assembly 14 preferably includes a tungsten halogen or high-intensity discharge lamp 18 enclosed in a reflector 20 that are and housed in a protective cage assembly (not shown) and cooled by a lamp fan (not shown). Lamp 18 is preferably a model UHP120 manufactured by Philips in Brussels, Belgium.

Light propagates from lamp assembly 14 in an X-axis direction along optical axis 12, through a light homogenizer 22 and a polarization beam splitter ("PBS") 24 to provide a substantially uniform field of visible light. Light homogenizer 22 preferably includes a pair of conventional lenslet arrays 26 but may alternatively employ a mirror tunnel or a fiber optic homogenizer, such as one described in U.S. Pat. No. 5,838,865 for FIBER OPTIC LIGHT HOMOGENIZER FOR USE IN PROJECTION DISPLAYS, which is assigned to the assignee of this application. Lenslet arrays 26 are preferably a type No. 036.192.00 available from Docter Optics located in Mesa, Ariz.

Uniform, polarized light propagating from PBS 24 in the X-axis direction, is reflected 90° by a 45° fold mirror 28, propagates in a Y-axis direction through a condenser lens 30, is reflected another 90° by a 45° fold mirror 32, propagates in a minus X-axis direction through relay lenses 34, and is reflected yet another 90° by a 45° fold mirror 36 to propagate in a minus Y-axis direction.

The light propagating from fold mirror 36 enters an LCD module 38 that preferably includes an input Fresnel lens 40, a polarizer 42, an LCD array 44, and an output Fresnel lens 46, all of which are cooled by an LCD fan (not shown). LCD array 44 is preferably a model LQ64SP1 manufactured by Sharp located in Teneri, Japan.

Figure 5:
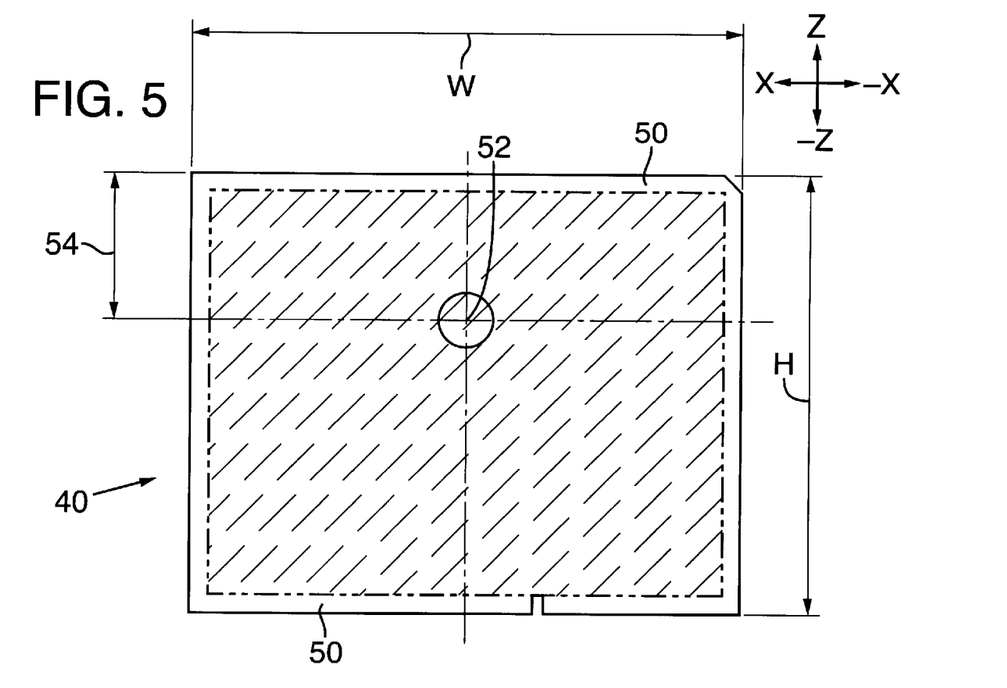
FIGS. 5 and 6 are front views of aspherical input and output Fresnel lenses employed in an LCD module of this invention.
Figure 6:
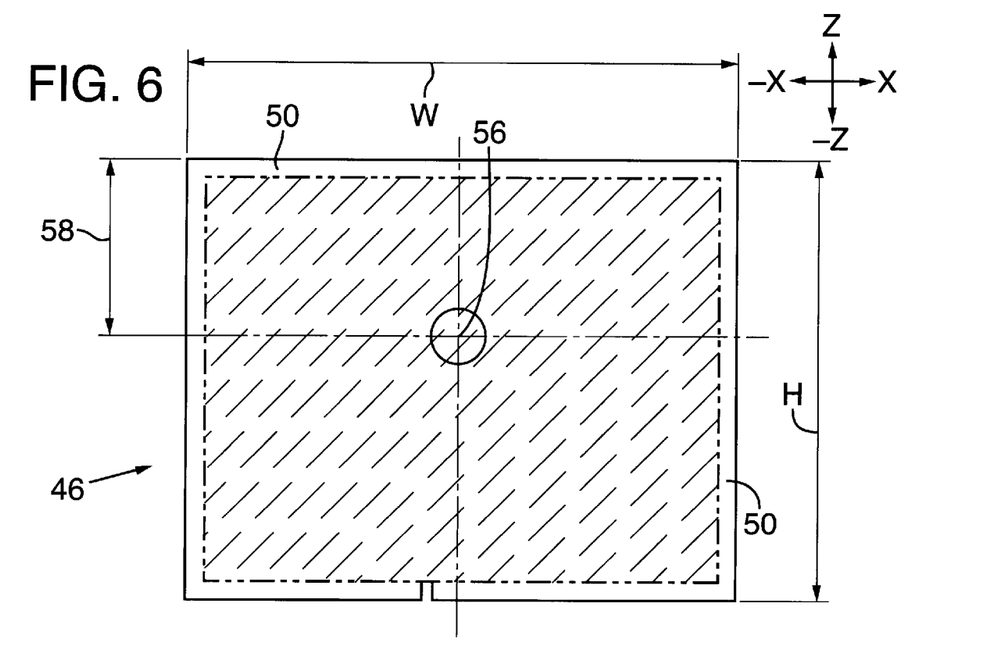

As shown in FIGS. 5 and 6, input and output Fresnel lenses 40 and 46 are each preferably formed on a 2 mm thick acrylic sheet having a 120 mm height H, a 150 mm width W, and 5 mm wide clear aperture borders 50. Input Fresnel lens 40 has an offset optical center 52 that is centered on width W and spaced down a distance 54 of 40 mm from the upper margin of lens 40. Likewise, output Fresnel lens 46 has an offset optical center 56 that is centered on width W and spaced down a distance 58 of 47.5 mm from the upper margin of lens 46. Input and output Fresnel lenses 40 and 46 are mounted in LCD module 38 with their grooved major surfaces facing inward toward LCD array 44. The optical parameters of input and output Fresnel lenses 40 and 46 are listed below in Table 1. Such Fresnel lenses are available as part numbers SC208 and SC968 from Fresnel Optics located in Rochester, N.Y.

TABLE 1

| Parameter | Input Fresnel | Output Fresnel |
| --- | --- | --- |
| Pitch | 0.5 mm | 0.2 mm |
| Focal length | 279.4 mm | 116.5 mm |
| Aspheric coef. A2 | 0.003611 | 0.008594 |
| Aspheric coef. A4 | 3.995 E-09 | 5.613 E-08 |
| Aspheric coef. A6 | −1.4781 E-14 | −1.391 E-12 |
| Aspheric coef. A8 | NA | 1.956 E-17 |

Referring again to FIG. 4, the light propagating from fold mirror 36 is refracted by input Fresnel lens 40 to an angle 60 of 5° upward (in a Z-axis direction) relative to the minus Y-axis direction. This causes the light to propagate through polarizer 42 and LCD array 44 at a slightly off-normal angle that optimizes the contrast ratio of the image bearing light transmitted by LCD array 44. For twisted nematic LCD arrays, the 5° off-normal light propagation can produce a 1,500:1 contrast ratio, whereas normal propagation produces only a 200:1 contrast ratio.

The image bearing light propagating from LCD array 44 is further refracted by output Fresnel lens 46 to an angle 62 of 9.72° upward relative to the minus Y-axis direction. Angle 62 introduces to the image bearing light an intentional Keystoning, which is employed beneficially, as described below, to reduce the depth and increase the contrast ratio of the LCD projection display of this invention.

The image bearing light propagating from output Fresnel lens 46 is reflected by a fold mirror 64 that is mounted at an angle 66 of 52° upward relative to the minus Y-axis direction. Accordingly, projection lens 16 is mounted coaxial to optical axis 12, which now extends at an angle 68 of 52° relative to the plane of fold mirror 64. However, the image bearing light is refracted about 10° off optical axis 12 and, therefore, surrounds and follows a Keystoning axis 70 through projection lens 16.

It is counter-intuitive to intentionally Keystone an image through a wide-angle projection lens, such as projection lens 16, because a Keystoned image requires a faster, higher precision lens to achieve the same focus, uniformity, and distortion specifications as a non-Keystoned image. However, this invention is advantageous because its benefits outweigh its disadvantages of being a more complex, but otherwise conventional, lens design.

Figure 7:
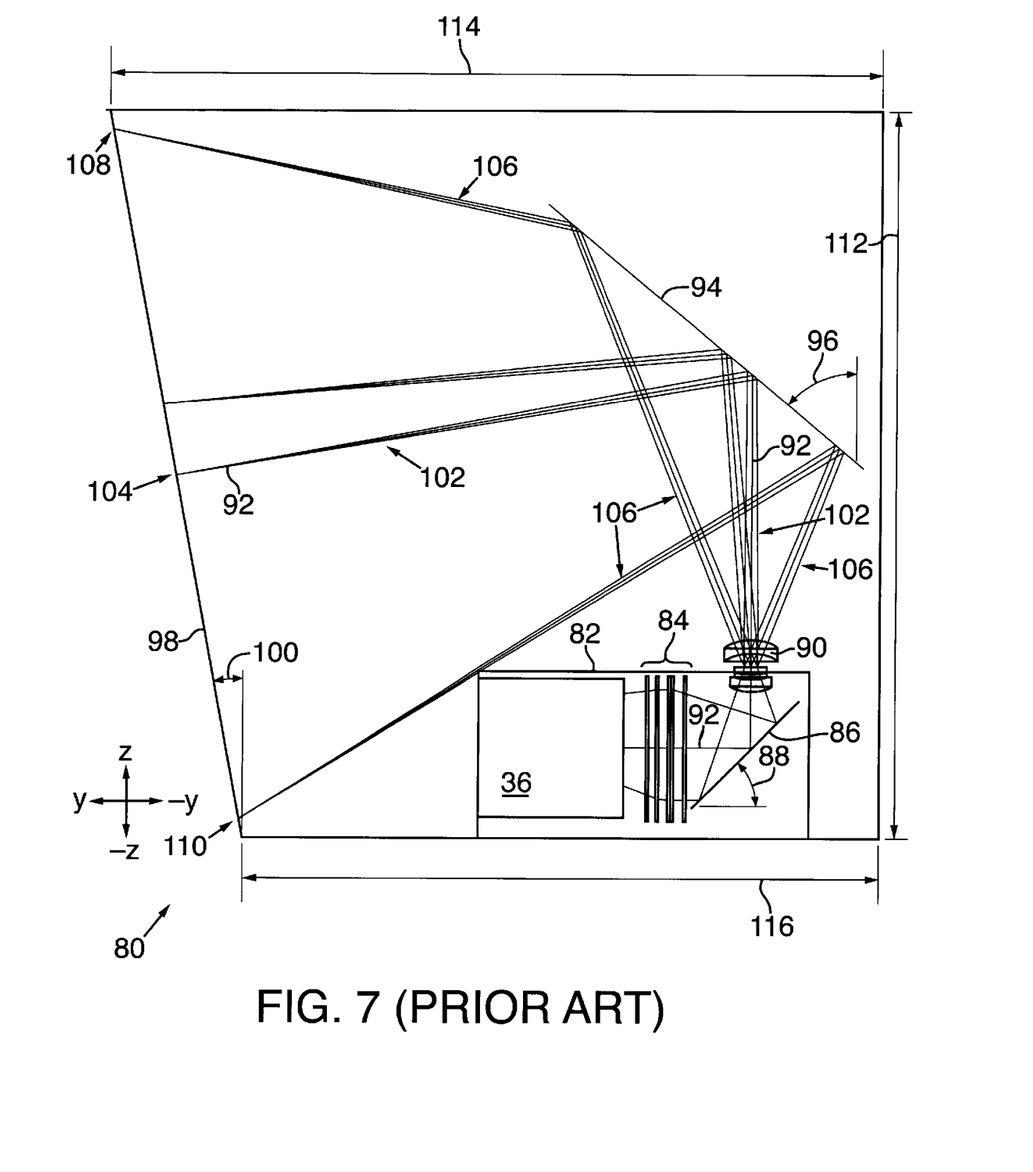
FIGS. 7 and 8 are simplified pictorial side views for comparing the differences between a conventional projection light path and an intentionally Keystoned projection light path of this invention.
Figure 8:
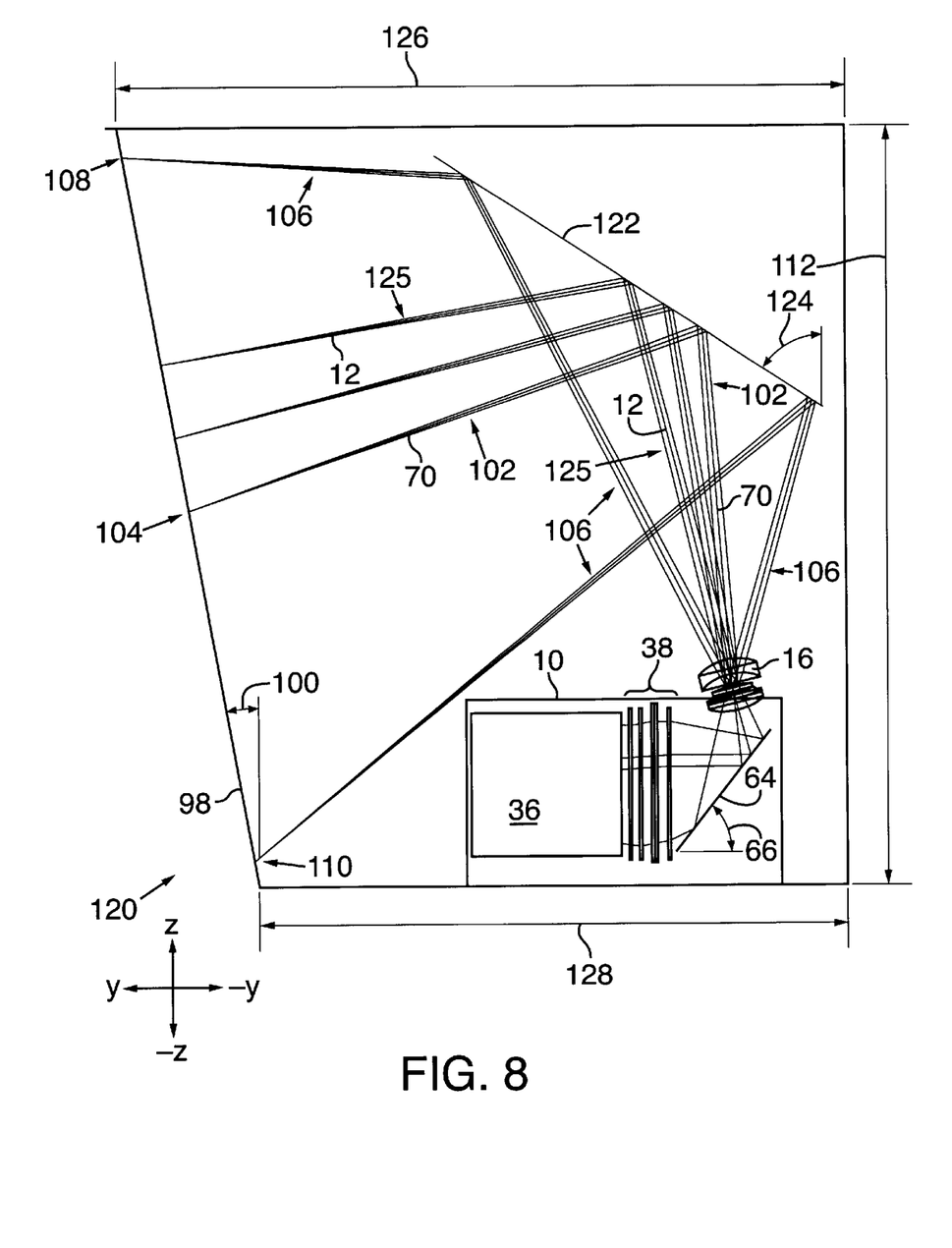

FIGS. 7 and 8 provide side views for comparing and, thereby, understanding the differences between a conventional projection light path and the intentionally Keystoned projection light path of this invention.

Referring first to FIG. 7, a conventional LCD projection display 80 houses a projection module 82 including a light path similar to projection module 10 (FIG. 3) from lamp assembly 14 (not shown) to fold mirror 36. However, the light propagating from fold mirror 36 enters a conventional LCD module 84 that includes an input Fresnel lens 86, a polarizer 88, an LCD array 90, and an output Fresnel lens 92. Unlike LCD module 38 of this invention, the light propagating from fold mirror 36, propagates through conventional LCD module 84 substantially parallel to the minus Y-axis direction and carries a non-Keystoned image. Accordingly, the image bearing light propagating from LCD module 84 is reflected by a fold mirror 86 that is mounted at an conventional angle 88 of 45° upward relative to the minus Y-axis direction, and a conventional projection lens 90 is mounted coaxial to an optical axis 92, which extends parallel to the Z-axis direction.

The image bearing light propagating from projection lens 90 is reflected by a fold mirror 94 that is mounted at an angle 96 of 50° downward relative to the Z-axis direction, thereby projecting the image bearing light onto a projection screen 98 that is tilted downward at an angle 100 of 10° relative to the Z-axis direction. Because the image bearing light is non-Keystoned, central light rays 102 propagating along optical axis 92 strike a center 104 of projection screen 98, and image margin light rays 106 strike a top margin 108 and bottom margin 110 of projection screen 98. Central light rays 102 and image margin light rays 106 propagate equal distances from projection lens 90, off fold mirror 94, to projection screen 98 and are, therefore, equally magnified.

Assuming that projection screen 98 has a 96.5 cm (38 inch) diagonal measurement, LCD projection display 80 must have a height 112 of 61 cm (24 inches), a top surface depth 114 of 63.5 cm (25 inches), and a bottom surface depth 116 of 53.3 cm (21 inches) in order to prevent projection module 82 from blocking image margin light rays 106.

In contrast, FIG. 8 shows an LCD projection display 120 of this invention that houses projection module 10 in which the light propagating from fold mirror 36 enters LCD module 38 and exits at angle 62 (FIG. 4), which introduces the intentional Keystoning of this invention. The Keystoned image bearing light propagating from LCD module 38 is reflected by fold mirror 64 that is mounted at angle 66 of 52° upward relative to the minus Y-axis direction, which introduces more intentional Keystoning. Projection lens 16 is mounted coaxial to optical axis 12, which extends at angle 68 (FIG. 4) of 52° relative to the plane of fold mirror 64. However, the Keystoned image bearing light is refracted about 10° off optical axis 12 and, therefore, surrounds and follows Keystoning axis 70 through projection lens 16.

The image bearing light propagating from projection lens 16 is reflected by a fold mirror 122 that is mounted at an angle 124 of 57° downward relative to the Z-axis direction, thereby projecting the image bearing light onto projection screen 98 that is tilted downward at angle 100 of 10° relative to the Z-axis direction. Because the image bearing light is Keystoned, central light rays 102 propagating along Keystoning axis 70 strike center 104 of projection screen 98, and image margin light rays 106 strike top margin 108 and bottom margin 110 of projection screen 98. Axial light rays 125 propagating along optical axis 12 strike projection screen 98 about 12 cm (4.75 inches) above center 104 of projection screen 98. Central light rays 102, image margin light rays 106, and axial light rays 125 propagate unequal distances from projection lens 16, off fold mirror 122, to projection screen 98 and are, therefore, unequally magnified by amounts that compensate for the Keystoning introduced by LCD module 38 and angle 66 of fold mirror 64.

The 7° steeper mounting angle 124 of fold mirror 122 allows positioning it in LCD projection display 120 higher in the Z-axis direction and more forward in the Y-axis direction. This fold mirror 122 positioning is advantageous because projection screen washout caused by first surface reflections from ambient lighting off fold mirror 122 are reduced.

The fold mirror 122 positioning is further advantageous because the depth dimensions of LCD projection display 120 are reduced as follows. Again assuming that projection screen 98 has a 96.5 cm (38 inch) diagonal measurement, LCD projection display 120 must still have a height 112 of 61 cm (24 inches), but requires a top surface depth 126 of only 58.4 cm (23 inches), and a bottom surface depth 128 of only 47.6 cm (18.75 inches) in order to prevent projection module 10 from blocking image margin light rays 106. The 11% depth reduction is particularly advantageous in interactive menu board applications.

The five fold mirrors in LCD projection display 120 provide a total length for optical axis 12 of 150.68 cm (59.3 inches), which is 3.16 times longer than bottom surface depth 128. Much of the compactness of this light path is embodied in the four fold mirrors in projection module 10, which result in a compact module that is accessible and removable from the bottom surface of LCD projection display 120. Moreover, projection screen 98 is removable to provide front access to projection module 10 and other interior components. All active components of LCD projection display 120 are, therefore, quickly replaceable without dismounting LCD projection display 120 from its wall or ceiling mounted position. Such replaceable components and modules are also lightweight, facilitating safe and rapid servicing by a single repair person.

The front and bottom access of LCD projection display 120 is further advantageous because internal cable channels are rendered accessible for interconnect wiring after display 120 installation.

Another advantage of LCD projection display 120 is that the large aperture sizes and angled light path of LCD module 38 allow suitable illumination of projection screen 98 with a 120 watt lamp 18, whereas prior designs required a 400 watt lamp to achieve the same brightness. The resulting low power illumination system provides reduced heat, higher reliability, longer operating life, and eases the cooling requirements for LCD projection display 120. Restaurant applications, in particular, require readily replaceable and cleanable filters, which are preferably mounted in and removable from the bottom surface of LCD projection display 120.

Skilled workers will recognize that portions of this invention may be implemented differently from the implementation described above for a preferred embodiment. For example, the various dimensions, angles, lenses, polarizers, and number of fold mirrors may be adapted to a wide variety of packaging configurations, including those with straight screens. Likewise, this invention is not limited to employing LCD displays and may employ various types of light valves, deflected mirror arrays, or cathode-ray tubes. The Keystoning employed by this invention may be implemented with optical component tilt angles in combination with or in place of the offset through LCD module 38.

It will be obvious to those having skill in the art that many changes may be made to the details of the above-described embodiments of this invention without departing from the underlying principles thereof. Accordingly, it will be appreciated that this invention is also applicable to display applications other than those found in LCD projection displays. The scope of the present invention should, therefore, be determined only by the following claims.

We claim:

1. A high contrast-ratio liquid crystal projection display apparatus, comprising:
    a housing having a bottom surface extending parallel to a Y-axis and perpendicular to a Z-axis;
    a projection screen forming a front surface of the housing and angled downward relative to the Z-axis;
    a main fold mirror positioned above a projection module and angled downward relative to the Z-axis to reflect image bearing light toward the projection screen; and
    said projection module supported by the bottom surface and projecting the image bearing light toward the main fold mirror, the projection module comprising:
        a light source propagating light along an optical axis;
        a first aspherical Fresnel lens diffracting the light at a first angle relative to the optical axis;
        a liquid crystal display positioned substantially parallel to the first aspherical Fresnel lens and transmitting the light received at the first angle to form the image bearing light; and
        a second aspherical Fresnel lens positioned substantially parallel to the liquid crystal display and diffracting the image bearing light at a second angle relative to the optical axis, wherein the image bearing light exiting the second aspherical Fresnel lens, reflected off the main fold mirror, and displayed on the projection screen has a contrast ratio that ranges from at least 200:1 to about 1,500:1.

2. The apparatus of claim 1 in which the first angle is about 5 degrees.

3. The apparatus of claim 1 in which the second angle ranges from about 5 degrees to about 10 degrees.

4. The apparatus of claim 1 in which the light source includes a lamp that dissipates less than about 120 watts.

5. The apparatus of claim 1 in which the projection module further includes a fold mirror angled upward greater than 45 degrees relative to the Y-axis to reflect the image bearing light toward the main fold mirror.

6. The apparatus of claim 1 in which the projection module further includes a projection lens that projects the image bearing light toward the main fold mirror.

7. The apparatus of claim 1 in which the projection screen has a diagonal measurement of at least about 96.5 cm (38 inches) and the bottom surface has a depth less than about 53.3 cm (21 inches).

8. The apparatus of claim 1 in which the projection module is accessible through an opening in the bottom surface.

9. The apparatus of claim 1 in which the projection screen is removable to enable servicing of interior components of the projection display.

10. The apparatus of claim 1 in which at least one of the first and second aspherical Fresnel lenses have a center that is offset from the optical axis.

11. A high contrast-ratio liquid crystal projection display method, comprising:
    providing a housing having a bottom surface extending parallel to a Y-axis and perpendicular to a Z-axis;
    forming a projection screen on a front surface of the housing, the projection screen angled downward relative to the Z-axis;
    positioning a main fold mirror above a projection module and angled downward relative to the Z-axis for reflecting image bearing light toward the projection screen;
    supporting said projection module by the bottom surface;
    propagating light along an optical axis of the projection module;
    diffracting the light at a first angle relative to the optical axis with a first aspherical Fresnel lens;
    positioning a liquid crystal display substantially parallel to the first aspherical Fresnel lens for transmitting the light received at the first angle and forming the image bearing light; and
    diffracting the image bearing light at a second angle relative to the optical axis with a second aspherical Fresnel lens positioned substantially parallel to the liquid crystal display such that the image bearing light exiting the second aspherical Fresnel lens reflects off the main fold mirror and is displayed on the projection screen at a contrast ratio that ranges from at least 200:1 to about 1,500:1.

12. The method of claim 11 in which at least one of the first and second aspherical Fresnel lenses have a center that is offset from the optical axis.

13. The method of claim 11 in which the first angle is about 5 degrees.

14. The method of claim 11 in which the second angle ranges from about 5 degrees to about 10 degrees.

15. The method of claim 11 further including providing the projection module with a fold mirror angled upward relative to the Y-axis for reflecting the image bearing light toward the main fold mirror.

16. The method of claim 11 further including providing the projection module with a projection lens for projecting the image bearing light toward the main fold mirror.

17. The method of claim 11 further including accessing the projection module through an opening in the bottom surface of the housing.

18. The method of claim 11 further including removing the projection screen and servicing interior components of the projection display.

* * * * *